United States Patent
Mashiko et al.

(10) Patent No.: US 6,723,147 B2
(45) Date of Patent: Apr. 20, 2004

(54) AIR-PERMEABLE FILTER FOR INK CARTRIDGE AND INK CARTRIDGE COMPRISING SAME

(75) Inventors: Hiroaki Mashiko, Osaka (JP); Hiroyuki Nishii, Osaka (JP)

(73) Assignee: Nitto Denko Corporation, Ibaraki (JP)

( * ) Notice: Subject to any disclaimer, the term of this patent is extended or adjusted under 35 U.S.C. 154(b) by 0 days.

(21) Appl. No.: 09/824,671

(22) Filed: Apr. 4, 2001

(65) Prior Publication Data

US 2001/0037629 A1 Nov. 8, 2001

(30) Foreign Application Priority Data

Apr. 5, 2000 (JP) ..................... P.2000-103502
Nov. 20, 2000 (JP) ..................... P.2000-352432

(51) Int. Cl.$^7$ ............................................. B01D 39/16
(52) U.S. Cl. .......................... 55/385.1; 55/486; 55/487; 55/522; 55/525; 55/528; 55/DIG. 5; 96/6; 156/60; 156/73.5; 156/73.6
(58) Field of Search ................ 55/486, 487, 385.1, 55/385.2, 385.6, 522, 525, 527, 528, DIG. 5; 96/6, 7, 11; 347/86, 87; 428/688, 480; 442/50; 156/60, 73.1, 73.5, 73.6

(56) References Cited

U.S. PATENT DOCUMENTS

| | | | |
|---|---|---|---|
| 3,352,622 A | | 11/1967 | Schachter |
| 3,953,862 A | | 4/1976 | Amberntsson et al. |
| 4,419,677 A | * | 12/1983 | Kasugayama et al. ....... 347/87 |
| 4,790,857 A | * | 12/1988 | Miksch ......................... 96/11 |
| 4,806,032 A | * | 2/1989 | Gragg et al. .................. 347/87 |
| 4,824,443 A | * | 4/1989 | Matson et al. ................. 95/44 |
| 5,108,474 A | * | 4/1992 | Riedy et al. ................... 55/486 |
| 5,286,382 A | * | 2/1994 | Scarmoutzos et al. ...... 210/490 |
| 5,446,118 A | * | 8/1995 | Shen et al. .................. 526/245 |
| 5,555,238 A | | 9/1996 | Miyazawa |
| 6,028,028 A | * | 2/2000 | Nitta ........................... 428/195 |
| 6,030,484 A | | 2/2000 | Maeoka et al. |

FOREIGN PATENT DOCUMENTS

| | | | | |
|---|---|---|---|---|
| EP | 0 630 755 A2 | * | 12/1994 | ........... B41J/2/165 |
| EP | 0 641 594 A2 | | 3/1995 | |
| EP | 0 684 136 A2 | | 11/1995 | |
| EP | 0 811 479 A2 | | 10/1997 | |
| EP | 0 811 479 A2 | * | 12/1997 | ............ B32B/5/24 |
| EP | 0 831 572 A1 | * | 3/1998 | ............ H02K/5/00 |
| JP | 7-171318 | | 7/1995 | |
| JP | 7-171318 | * | 11/1995 | ........... B01D/39/16 |
| JP | 9-295406 | * | 11/1997 | ............ B41J/2/175 |

OTHER PUBLICATIONS

Internet Publication "TYVEK® for Packaging—Products", http://www.tyvek.com/na/industrialpack/english/4products/index.html, E.I. DuPont de Nemours and Company, 2000.*

\* cited by examiner

Primary Examiner—Duane Smith
Assistant Examiner—Jason M. Greene
(74) Attorney, Agent, or Firm—McGinn & Gibb, PLLC

(57) ABSTRACT

An air-permeable filter for an ink cartridge includes at least one porous material layer including at least one resin selected from the group including fluororesin and polyolefin resin, and at least one air-permeable substrate layer having a tensile strength of 1 MPa or more. In addition, an ink cartridge includes a space for receiving an ink and at least one air vent in which the air-permeable filter is provided.

34 Claims, 4 Drawing Sheets

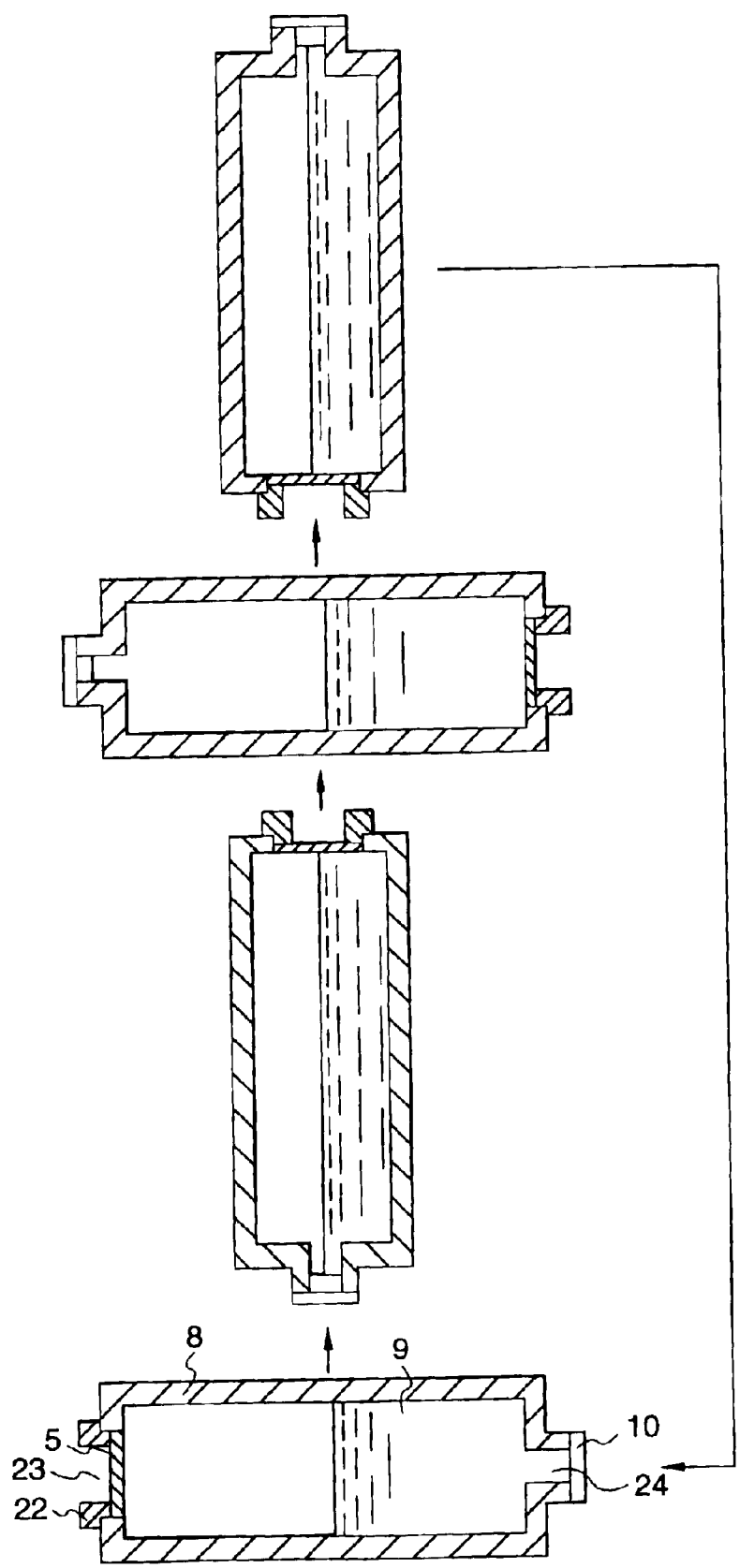

AIR-PERMEABLE FILTER FOR INK CARTRIDGE AND INK CARTRIDGE COMPRISING SAME

FIELD OF THE INVENTION

The present invention relates to an air-permeable filter for ink cartridge and an ink cartridge comprising such an air-permeable filter. More particularly, the present invention relates to an ink cartridge comprising an air vent communicating between an inner space for receiving and storing an ink and the outer space and an air-permeable filter to be provided in the air vent.

BACKGROUND OF THE INVENTION

Most of image forming apparatus such as printer have heretofore employed a mechanism for supplying an ink into a printing head from an ink cartridge. In this mechanism, an ink cartridge which has previously received an ink therein is mounted on a printer or the like in position. Under these conditions, the ink is supplied into the printing head from the ink cartridge. Between the ink cartridge and the printing head may be provided an ink reservoir cartridge for temporarily receiving an ink. As a dispersant for ink component there is normally used water or a mixture of water and an organic solvent having a good compatibility with water (e.g., lower alcohol such as methanol, ethanol, isopropyl alcohol and n-propanol).

However, when the liquid level of the ink descends as the amount of the ink decreases, a negative pressure is produced in the interior of the ink cartridge or the ink passage. When the negative pressure increases, normal ejection of ink is prevented, giving blurred prints. In order to prevent this defect, an air vent is provided in the ink cartridge or ink passage. The air vent is disposed in such a position that it is not dipped in the ink during normal use with the ink cartridge being mounted on the printer. However, when the printer or ink cartridge is tilted during transportation or storage, the air vent can be dipped in the ink, possibly causing the ink to be leaked through the air vent. In order to prevent this defect, it is proposed that an air-permeable filter which is permeable to air but impermeable to liquid, e.g., porous polytetrafluoroethylene (hereinafter referred to as "PTFE") be attached to the air vent.

Further, it is a recent tendency that the interior of the ink cartridge or ink passage is pressurized to accelerate the ejection of the ink in order to raise the printing speed of the printer. Moreover, since the ink in the ink cartridge or ink passage can be leaked from the printing head as the ambient temperature of the printer increases, it has been practiced to reduce the pressure in the ink cartridge or ink passage at the end of printing, causing the ink to be sucked up.

Thus, a positive or negative pressure can be applied to the interior of the ink cartridge or ink passage through the air vent. Accordingly, the air-permeable filter has been required to prevent ink leakage steadily.

SUMMARY OF THE INVENTION

To this end, an object of the present invention is to provide an air-permeable filter for ink cartridge which can fairly prevent ink leakage. Another object of the present invention is to provide an ink cartridge comprising this air-permeable filter.

The foregoing object of the invention is accomplished with an air-permeable filter for ink cartridge according to the invention which comprises a laminate comprising at least one porous material layer comprising at least one resin selected from the group consisting of fluororesin and polyolefin resin and at least one air-permeable substrate layer having a tensile strength of 1 MPa or more.

BRIEF DESCRIPTION OF THE DRAWINGS

FIG. 7 is a diagram illustrating the rotation of the ink cartridge during a test made in examples.

DESCRIPTION OF THE REFERENCE NUMERALS AND SIGNS

| | |
|---|---|
| 1, 8 | Case |
| 2, 9 | Ink |
| 5 | Air-permeable filter |
| 6 | Porous material |
| 7 | Air-permeable substrate |
| 10 | Cover |
| 11 | Ink feed port |
| 12, 22 | Cap |
| 13, 23 | Air vent |
| 14, 24 | Ink ejection hole |
| 15 | Ink suction hole |

DETAILED DESCRIPTION OF THE INVENTION

The tensile strength is determined herein according to JIS K 7127-1989, with the proviso that the testing rate is 200 mm/min.

The air-permeable filter for ink cartridge according to the invention comprises a porous material reinforced by an air-permeable substrate having a tensile strength of 1 MPa or more and thus exhibits a high resistance to ink leakage. In particular, since the reinforcement is made by an air-permeable substrate having a high tensile strength, deformation due to pressurizing or reduction of pressure can be effectively inhibited. Further, since as a porous material there is used a material which can be easily rendered porous to a high precision, an air-permeable filter having a high permeation stability can be provided. The upper limit of the tensile strength of the air-permeable substrate is not specifically limited. In practice, however, the tensile strength of the air-permeable substrate is preferably from 1 MPa to 1,500 MPa, more preferably from 3 MPa to 500 MPa, from the standpoint of workability in welding thereof to the porous material.

In the air-permeable filter according to the invention, the air permeability of the air-permeable substrate is preferably 300 sec/100 ml or less as represented by Gurley number. This is because the difference in pressure between the interior and the exterior of the ink cartridge can be rapidly eliminated. Gurley number is determined herein according to Gurley testing method defined in JIS P 8117–1998. The lower limit of Gurley number is not specifically limited. In practice, however, Gurley number of the air-permeable filter is preferably from 0.1 sec/100 ml to 300 sec/100 ml, more preferably from 0.5 sec/100 ml to 100 sec/100 ml, from the standpoint of reinforcement of the porous material.

In the air-permeable filter according to the invention, at last one layer of the laminate is preferably rendered water-repellent and oil-repellent. This is because the permeation of ink through the filter can be inhibited, making it possible to prevent the ink leakage more effectively. Further, in the air-permeable filter according to the invention, the porous material preferably comprises PTFE, and the air-permeable substrate preferably comprises a ultrahigh molecular polyethylene.

The ink cartridge according to the invention comprises a space for receiving an ink and at least one air vent in which the foregoing air-permeable filter is provided. The ink cartridge according to the invention exhibits an improved resistance to ink leakage.

Preferred embodiments of the present invention will be described hereinafter in connection with the attached drawings.

Figure 1:
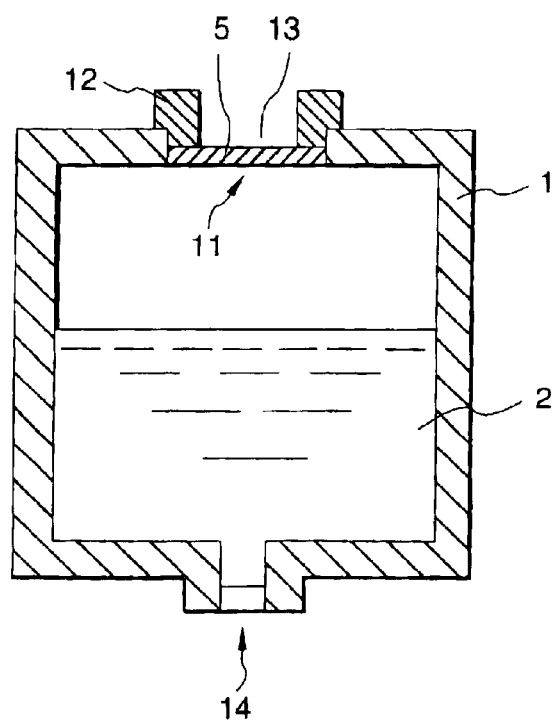
FIG. 1 is a sectional view illustrating an embodiment of the ink cartridge according to the invention.

FIG. 1 is a sectional view illustrating an embodiment of the ink cartridge comprising the air-permeable filter according to the invention. The interior of the ink cartridge comprises a case 1 the interior of which is used as a space for receiving an ink 2. The ink 2 is injected into the interior of the case through an ink injection hole 11. After the injection of the ink 2, a cap 12 is fitted in the ink injection hole 11. The ink 2 is fed into a drawing device such as printer head through an ink ejection hole 14 with the ink cartridge mounted on the printer head or the like.

Inside the cap 12 is provided an air vent 13. The inner space of the case 1 and the exterior space (atmosphere) are communicated to each other through the air vent 13. On the air vent 13 is mounted an air-permeable filter 5. The air-permeable filter 5 is complexed with the cap 12 which is mounted so as to close the ink injection hole 11. The air-permeable filter 5 may be previously fixed to the cap 12 by heat welding, ultrasonic welding, vibrational welding, bonding, adhesion or the like.

A plurality of air vents 13 each comprising an air-permeable filter 5 may be provided in the case. In this case, the plurality of air vents are preferably disposed such that at least one of the air vents is not covered by the ink which has been introduced in the case in a predetermined amount regardless of the position of the ink cartridge.

As the air-permeable filter 5 there may be used a laminate which comprises a porous material comprising PTFE or polyolefin resin and an air-permeable substrate. This laminate may comprise at least one porous material layer and at least one air-permeable substrate. The number of layers to be laminated and the order of lamination of these layers are not specifically limited. In order to lower the permeability of the air-permeable filter to ink, the foregoing porous material preferably faces the inner space of the ink cartridge (space for receiving an ink). Accordingly, the air-permeable filter preferably has the foregoing porous material exposed on at least one side thereof.

Figure 2:
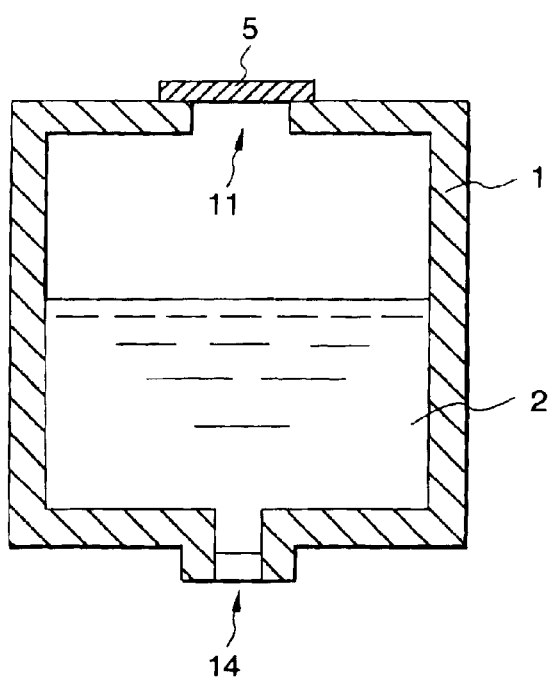
FIG. 2 is a sectional view illustrating another embodiment of the ink cartridge according to the invention.

FIG. 2 is a sectional view illustrating another embodiment of the ink cartridge according to the invention.

In this ink cartridge, an air-permeable filter 5 is directly fixed to a case 1 so as to cover an ink injection hole 11. In either of the embodiments of FIGS. 1 and 2, the ink may be sucked up into the interior of the case through an ink ejection hole 14 by evacuating the case through the air-permeable filter instead of being injected into the case through the ink injection hole.

Figure 3:
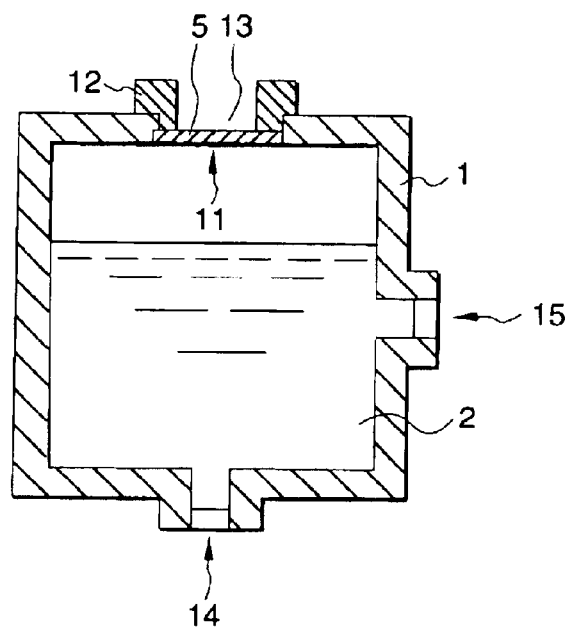
FIG. 3 is a sectional view illustrating a further embodiment of the ink cartridge according to the invention.

FIG. 3 is a sectional view illustrating an embodiment of an ink reservoir cartridge as an ink cartridge of the invention. This ink reservoir cartridge is arranged so as to force the ink to be ejected through an ejection hole 14 under external pressure through an air-permeable filter 5 or suck up the ink through a suction hole 15 under reduced pressure.

However, the present invention is not limited to the embodiments shown in FIGS. 1 to 3 and can apply to ordinary ink cartridges.

The porous material and air-permeable substrate will be further described hereinafter.

As the porous material there may be used a porous fluororesin membrane or porous polyolefin membrane. Examples of the fluororesin employable herein include PTFE, polychlorotrifluoroethylene, tetrafluoroethylene-hexafluoropropylene copolymer, tetrafluoroethylene-perfluoroalkylvinylether copolymer, and tetrafluoroethylene-ethylene copolymer. Examples of the polyolefin employable herein include polyethylene, polypropylene, poly-4-methyl-1-pentene, and poly-1-butene. In particular, porous PTFE membrane is excellent in air permeability, ink resistance, water repellency and oil repellency and thus does not cause clogging that results in the deterioration in air permeability and can prevent ink leakage over an extended period of time.

An embodiment of the process for the preparation of PTFE will be described hereinafter. Firstly, a paste-like mixture obtained by adding a liquid lubricant to a fine powder of PTFE is preformed. The liquid lubricant to be used herein is not specifically limited so far as it can wet the surface of the fine powder of PTFE and can be removed by extraction or drying. For example, a hydrocarbon such as liquid paraffin, naphtha and white oil can be used. The amount of the liquid lubricant to be added is preferably from about 5 to 50 parts by weight based 100 parts by weight of the fine powder of PTFE. The foregoing preforming is effected at a pressure such that the liquid lubricant cannot be squeezed out of the paste-like mixture. Subsequently, the preform thus obtained is formed into a sheet by paste extrusion or rolling. The formed PTFE product is then stretched at least monoaxially to obtain a porous PTFE membrane. The stretching of the formed PTFE product is preferably preceded after the removal of the liquid lubricant. The porous material may be heated and calcined at a temperature of not lower than the melting point of PTFE.

When the diameter of the pores in the porous membrane is too great, the resulting membrane exhibits a reduced strength or can undergo ink leakage when the inner pressure of the ink cartridge rises. Accordingly, the average diameter of the pores in the porous membrane is preferably 10 $\mu$m or less, particularly from 0.01 $\mu$m to 5 $\mu$m.

Similarly, when the thickness of the porous membrane is too small, the resulting porous material exhibits a reduced strength or can undergo ink leakage when the inner pressure of the ink cartridge rises. Accordingly, the thickness of the porous membrane is preferably 2 $\mu$m or more, particularly from 10 $\mu$m to 1,000 $\mu$m.

The material, structure and form of the air-permeable substrate are limited. In particular, taking into account the durability against the stress developed when pressurizing or evacuation is made through the air-permeable filter, the tensile strength of the air-permeable filter is predetermined to 1 MPa or more. Further, the air permeability of the air-permeable filter is preferably 300 sec/100 ml or less as represented by Gurley number. From the standpoint of fusibility to the ink cartridge or mounting parts, the air-permeable substrate preferably comprises a thermoplastic resin and preferably has a melting point of 250° C. or lower.

Specific examples of the material to be used as an air-permeable substrate include porous polyolefin, non-woven fabric, woven fabric, net, mesh, sponge, foam, porous metal, metal mesh, and other various porous materials. From the standpoint of strength, elasticity, air permeability, workability and fusibility, a porous ultrahigh molecular polyethylene is particularly preferred. The viscometric average molecular weight of the ultrahigh molecular polyethylene is 300,000 or more, preferably from 500,000 to 10,000,000.

The complexing of the porous material with the air-permeable substrate may be accomplished by merely stacking the two layers or by heat-welding, ultrasonically welding or vibrationally welding the two layers. Alternatively, the two layers may be bonded to each other with an adhesive (e.g., pressure-sensitive adhesive, hot-melt adhesive, heat-hardening adhesive). The complexing accompanied by heating (heat lamination) can be accomplished by a method involving partial fusion of the air-permeable substrate or a method which comprises heating the laminate with a powdery, granular or network hot-melt adhesive provided interposed between the two layers to cause bonding.

As mentioned above, the order of lamination of the porous material and the air-permeable substrate is not specifically limited. The porous material and the air-permeable substrate may be alternately laminated on each other. Alternatively, the laminate may contain a continuous laminate of porous material layers. The laminate may comprise porous material layers containing different resins. Embodiments of the composite structure of the air-permeable filter are shown in FIGS. 4 and 5.

Figure 4:
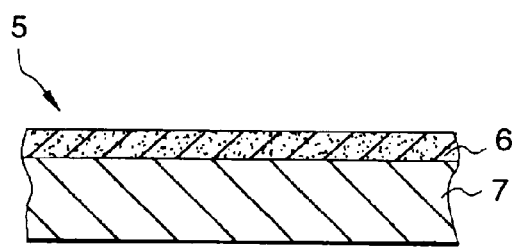
FIG. 4 is a sectional view illustrating an embodiment of the air-permeable filter according to the invention.
Figure 5:
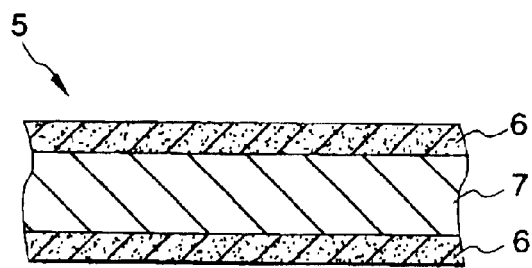
FIG. 5 is a sectional view illustrating another embodiment of the air-permeable filter according to the invention.

The air-permeable filter 5 shown in FIG. 4 is a composite material comprising a porous material layer 6 and an air-permeable substrate 7 complexed to each other. This air-permeable filter is preferably disposed such that the porous material 6 faces the space for receiving the ink. The air-permeable filter 5 shown in FIG. 5 is a composite material comprising an air-permeable substrate 7 interposed between two porous material layers 6.

The air-permeable filter may be rendered water-repellent and oil-repellent depending on the properties of the porous material or ink. The porous material of the air-permeable filter is preferably rendered water-repellent and oil-repellent. However, the air-permeable substrate may be rendered water-repellent and oil-repellent. Alternatively, the air-permeable filter may be entirely rendered water-repellent and oil-repellent.

As a water repellent or oil repellent there may be specifically used any or various fluorine-containing polymers. A polymer having a fluorine-containing chain forms a low surface energy film on the surface of a fiber to exert a water- and oil-repellent effect. As the fluorine-containing polymer there is preferably used a polymer having a perfluoroalkyl group. As such a polymer having a perfluoroalkyl group there may be used a commercially available water- or oil-repellent such as Florad (produced by Sumitomo 3M), Scothguard (produced by Sumitomo 3M), Texguard (produced by DAIKIN INDUSTRIES, LTD.), Unidyne (produced by DAIKIN INDUSTRIES, LTD.) and Asahiguard (produced by Asahi Glass Co., Ltd.). The water- and oil-repellent treatment may be carried out by dipping the material in a water- and oil-repellent or applying or spraying the water- and oil-repellent onto the material. The coated amount of the water- and oil-repellent is preferably adjusted such that a sufficient water- and oil-repellency can be obtained and the air permeability of the air-permeable filter cannot be impaired.

The present invention will be further described in the following examples, but the present invention should not be construed as being limited thereto.

EXAMPLE 1

A porous PTFE material (thickness: 85 $\mu$m; porosity: 80%; average pore diameter: 1 $\mu$m; Gurley number: 3 sec/100 ml) and Sintex PS-120 (produced by Mitsui Chemical Co., Ltd.; thickness: 0.6 mm; tensile strength: 6 MPa; Gurley number: 1 sec/100 ml), which is a non-woven fabric of polypropylene, were heat-laminated to each other to prepare an air-permeable filter having the same configuration as shown in FIG. 4.

Figure 6:
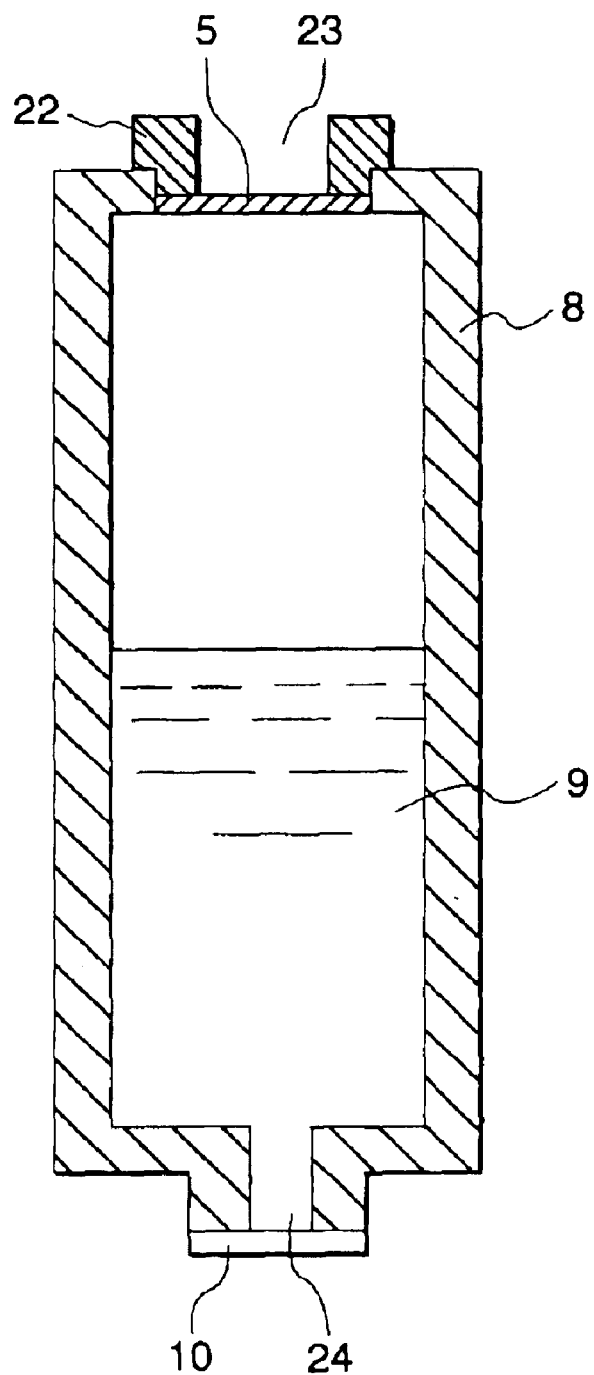
FIG. 6 is a sectional view illustrating an ink cartridge prepared in an example.

Separately, in order to obtain an ink cartridge having the air-permeable filter thus prepared mounted thereon shown in FIG. 6, a cylindrical plastic case 8 having a diameter of 2 cm and a height of 20 cm was filled with a commercially available ink for printer 9 (surface tension: 33 dyne/cm) in an amount of 30 cm$^3$. As an air vent 23 there was prepared a polypropylene cap 22 having a hole having a diameter of 5 mm formed therein. To an ink ejection hole 24 having an inner diameter of 1 mm had been previously attached a cover 10. The foregoing air-permeable filter 5 comprising a porous PTFE material and a nonwoven fabric of polypropylene was then heat-fused to the cap 22 so as to cover the air vent 23 to form an integrated body. The air-permeable filter was disposed such that the porous PTFE material faces the ink (the interior of the case) and the nonwoven fabric faces the atmosphere.

EXAMPLE 2

Unidyne TG-725 (produced by DAIKIN INDUSTRIES, LTD.) was diluted with toluene to prepare a water- and oil-repellent having a solid content of 5% by weight. The repellent thus obtained was applied to a porous PTFE material (thickness: 85 $\mu$m; porosity: 75%; average pore diameter: 0.2 $\mu$m; Gurley number: 21 sec/100 ml), and then heated to a temperature of 130° C. for 3 minutes to obtain a porous water- and oil-repellent PTFE material. In combination with the porous water- and oil-repellent PTFE material thus obtained, a ultrahigh molecular porous polyethylene (viscometric average molecular weight: 4,400,000; thickness: 0.5 mm; tensile strength: 12 MPa; Gurley number: 1.5 sec/100 ml) was then prepared as an air-permeable substrate. An air-permeable filter was then prepared in the same manner as in Example 1. An ink cartridge was then prepared in the same manner as in Example 1.

EXAMPLE 3

An air-permeable filter was prepared in the same manner as in Example 2 except that a porous polypropylene material (thickness: 10 $\mu$m; porosity: 50%; average pore diameter: 0.04 $\mu$m; Gurley number: 200 sec/100 ml) was used instead of the porous PTFE material. An ink cartridge was then prepared.

COMPARATIVE EXAMPLE 1

An air-permeable filter was prepared in the same manner as in Example 1 except that Tapyrus P030UA-00X (produced by Tonen Tapyrus Co., Ltd.; thickness: 0.5 mm; tensile strength: 0.6 MPa; Gurley number: 1 sec/100 ml), which is a nonwoven fabric of polyurethane, was used as an air-permeable substrate. An ink cartridge was then prepared.

COMPARATIVE EXAMPLE 2

An air-permeable filter was prepared in the same manner as in Example 1 except that a porous polypropylene material (thickness: 0.03 mm; tensile strength: 0.9 MPa; Gurley number: 400 sec/100 ml) was used as an air-permeable substrate. An ink cartridge was then prepared.

The ink cartridges obtained in the foregoing examples and comparative examples were each then subjected to the following tests. For ink leakage test, the ink cartridge was mounted on a testing machine capable of rotating the sample at a turn per second in such an arrangement that the ink comes in contact with the air-permeable filter as shown in FIG. 7. The operation of the testing machine was suspended every a predetermined number of turns to visually observe the filter for ink bleeding or leakage until the sample rotated 500,000 times. When no ink bleeding or leakage was observed, it was evaluated by the symbol ○. When some ink bleeding or leakage was observed, it was evaluated by the symbol ×.

For ink ejection test, the cover 10 was removed to open the ejection hole 24 with the cartridge kept almost upright as shown in FIG. 6. Under these conditions, visual observation was made to see if the ink is entirely ejected in 10 seconds. When the ink was ejected, it was evaluated by the symbol ○. When the ink was not ejected, it was evaluated by the symbol ×.

The results of ink leakage test and ink ejection test are shown in Table 1.

TABLE 1

|  | Ink leakage test | | Ink ejection |
|---|---|---|---|
|  | 100,000 turns | 500,000 turns | test |
| Example 1 | ○ | X | ○ |
| Example 2 | ○ | ○ | ○ |
| Example 3 | ○ | ○ | ○ |
| Comparative Example 1 | X | — | ○ |
| Comparative Example 2 | X | — | X |

As mentioned above, in accordance with the present invention, the use of an air-permeable filter obtained by stacking at least one porous material layer comprising at least one resin selected from the group consisting of PTFE and polyolefin resin over at least one air-permeable substrate layer having a tensile strength of 1 MPa or more makes it possible to provide an ink cartridge which can be effectively prevented from undergoing ink leakage during transportation or storage.

While the invention has been described in detail and with reference to specific embodiments thereof, it will be apparent to one skilled in the art that various changes and modifications can be made therein without departing from the spirit and scope thereof.

What is claimed is:

1. An air-permeable filter for an ink cartridge, said air-permeable filter comprising:
    a laminate comprising:
        at least one porous material layer comprising at least one resin selected from the group consisting of fluororesin and polyolefin resin; and
        at least one air-permeable substrate layer having a tensile strength of 1 MPa or more; and having an outer surface bonded to said at least one porous material layer; and
    one of a heat weld, ultrasonic weld, vibrational weld, and adhesive for bonding said at least one air-permeable substrate layer to said at least one porous material layer,
    wherein a Gurley number of said air-permeable filter is less than 100 sec/100 ml.

2. The air-permeable filter for an ink cartridge according to claim 1, wherein said at least one air-permeable substrate layer comprises one of a nonwoven fabric, woven fabric, net, mesh, sponge, foam, porous metal, and metal mesh.

3. The air-permeable filter for an ink cartridge according to claim 1, wherein at least one layer of said laminate has been rendered water-repellent and oil-repellent.

4. The air-permeable filter for an ink cartridge according to claim 1, wherein said porous material comprises a polytetrafluoroethylene and said air-permeable substrate comprises a ultrahigh molecular weight polyethylene.

5. An ink cartridge comprising:
    a case for receiving an ink;
    at least one air vent in said case; and
    an air-permeable filter provided in said at least one air vent, said air-permeable filter comprising:
        a laminate comprising:
            at least one porous material layer comprising at least one resin selected from the group consisting of fluororesin and polyolefin resin; and
            at least one air-permeable substrate layer having a tensile strength of 1 MPa or more, and having an outer surface bonded to said at least one porous material layer; and
        one of a heat weld, ultrasonic weld, vibrational weld, and adhesive for bonding said at least one air-permeable substrate layer to said at least one porous material layer,
    wherein a Gurley number of said air-permeable filter is less than 100 sec/100 ml.

6. The air-permeable filter for an ink cartridge according to claim 1, wherein the tensile strength of the air-permeable substrate is from 1 Mpa to 1,500 Mpa.

7. The air-permeable filter for an ink cartridge according to claim 6, wherein the tensile strength of the air-permeable substrate is from 3 MPa to 500 Mpa.

8. The air-permeable filter for an ink cartridge according to claim 2, wherein the Gurley number of the air-permeable filter is from 0.1 sec/100 ml to less than 100 sec/100 ml.

9. The air-permeable filter for an ink cartridge according to claim 8, wherein the Gurley number of the air-permeable filter is from 0.5 sec/100 ml to less than 100 sec/100 ml.

10. The air-permeable filter for an ink cartridge according to claim 1, wherein the average diameter of the pores in the porous material is 10 µm or less.

11. The air-permeable filter for an ink cartridge according to claim 10, wherein the average diameter of the pores in the porous material is from 0.01 µm to 5 µm.

12. The air-permeable filter for an ink cartridge according to claim 1, wherein the thickness of the porous material is 2 µm or more.

13. The air-permeable filter for an ink cartridge according to claim 12, wherein the thickness of the porous material is from 10 µm to 1,000 µm.

14. The air-permeable filter for an ink cartridge according to claim 4, wherein the viscometric average molecular weight of the ultrahigh molecular weight polyethylene is 300,000 or more.

15. The air-permeable filter for an ink cartridge according to claim 14, wherein the viscometric average molecular weight of the ultrahigh molecular weight polyethylene is from 500,000 to 10,000,000.

16. The ink cartridge according to claim 5, wherein the porous material of the air-permeable filter faces an inner space of the ink cartridge.

17. An air-permeable filter comprising:
at least one porous material layer comprising at least one of a fluororesin and polyolefin resin; and
at least one air-permeable substrate layer having a tensile strength of 1 MPa or more, and having an outer surface bonded to said at least one porous material layer; and
one of a heat weld, ultrasonic weld, vibrational weld, and adhesive for bonding said at least one air-permeable substrate layer to said at least one porous material layer,
wherein a Gurley number of said air-permeable filter is less than 100 sec/100 ml.

18. The air-permeable filter according to claim 17, wherein said air permeable substrate layer comprises ultrahigh molecular weight polyethylene.

19. The air-permeable filter according to claim 17, wherein a Gurley number of the air-permeable filter is from 0.5 sec/100 ml to less than 100 sec/100 ml.

20. The air-permeable filter according to claim 17, wherein said at least one porous material layer is water-repellant and oil-repellant.

21. The air-permeable filter according to claim 17, wherein said at least one air-permeable substrate layer is water-repellant and oil-repellant.

22. The air-permeable filter according to claim 17, wherein said at least one porous material layer comprises two porous material layers, and wherein said at least one air permeable substrate layer is formed between said two porous material layers.

23. The ink cartridge according to claim 5, further comprising:
a cap portion inserted in said at least one air vent,
wherein said air permeable filter is affixed to said cap portion so as to cover said at least one air vent.

24. The ink cartridge according to claim 23, further comprising:
one of a heat weld, a vibrational weld, and an adhesive for affixing said air permeable filter laminate to said cap portion.

25. The ink cartridge according to claim 5, wherein said air permeable filter is directly affixed to said case so as to cover said at least one air vent.

26. The ink cartridge according to claim 5, wherein said at least one air vent comprises a plurality of air vents, and wherein at least one air vent in said plurality of air vents is not covered by ink in said ink cartridge.

27. The air-permeable filter for an ink cartridge according to claim 1, wherein said at least one air-permeable substrate layer comprises a thickness of at least 0.5 mm.

28. The air-permeable filter for an ink cartridge according to claim 1, wherein said at least one porous material layer comprises calcined polytetrafluoroethylene.

29. The air-permeable filter according to claim 22, wherein said at least one porous material layer comprises a first porous material layer, and a second porous material layer which comprises a material which is different from a material in said first porous material layer.

30. A method of manufacturing an air-permeable filter for an ink cartridge, said method comprising:
providing at least one porous material layer comprising fluororesin; and
laminating at least one air-permeable substrate layer having a tensile strength of 1 MPa or more, on said at least one porous material layer, said laminating comprising one of heat welding, ultrasonic welding, vibrational welding, and applying an adhesive, and
wherein a Gurley number of said air-permeable filter is less than 100 sec/100 ml.

31. The method according to claim 30, wherein said applying an adhesive comprises interposing a hot-melt adhesive between said at least one porous material layer and said at least one air-permeable substrate layer to form a laminate, and heating the laminate.

32. The air-permeable filter for an ink cartridge according to claim 1, wherein said heat weld comprises a hot-melt adhesive interposed between said at least one porous material layer and said at least one air-permeable substrate layer.

33. The air-permeable filter for an ink cartridge according to claim 1, wherein said heat weld comprises a partially-fused portion of said at least one air permeable substrate.

34. The air-permeable filter for an ink cartridge according to claim 1, wherein said heat weld is formed without an application of substantial pressure.

* * * * *